United States Patent
Naguleswaran et al.

(10) Patent No.: US 7,415,001 B2
(45) Date of Patent: Aug. 19, 2008

(54) METHOD AND RECEIVER FOR PROCESSING A MULTI-USER SIGNAL

(75) Inventors: Sanjeev Naguleswaran, Athlestone (AU); Mark Rice, Kensington Park (AU)

(73) Assignee: DSpace Pty Ltd, Mawson Lakes (AU)

( * ) Notice: Subject to any disclaimer, the term of this patent is extended or adjusted under 35 U.S.C. 154(b) by 297 days.

(21) Appl. No.: 10/510,473

(22) PCT Filed: Jun. 13, 2003

(86) PCT No.: PCT/AU03/00740

§ 371 (c)(1),
(2), (4) Date: Mar. 15, 2005

(87) PCT Pub. No.: WO03/107546

PCT Pub. Date: Dec. 24, 2003

(65) Prior Publication Data

US 2005/0174983 A1    Aug. 11, 2005

(30) Foreign Application Priority Data

Jun. 14, 2002    (AU) .................................... PS 2978

(51) Int. Cl.
| | |
|---|---|
| *H04B 7/212* | (2006.01) |
| *H04J 3/00* | (2006.01) |
| *H04Q 7/20* | (2006.01) |
| *H04L 5/14* | (2006.01) |
| *H04Q 7/00* | (2006.01) |
| *H04Q 7/28* | (2006.01) |
| *H04B 1/16* | (2006.01) |
| *H04B 1/00* | (2006.01) |
| *H04L 5/12* | (2006.01) |
| *H03D 1/00* | (2006.01) |

(52) U.S. Cl. ........................ 370/347; 370/252; 370/294; 370/337; 370/442; 370/280; 455/207; 455/452.1; 375/148; 375/262; 375/341

(58) Field of Classification Search .................. 370/347, 370/337, 321, 252, 294, 320, 442; 375/346, 375/148, 262, 285, 286, 641; 455/63.1, 67.11, 455/67.13, 207

See application file for complete search history.

(56) References Cited

U.S. PATENT DOCUMENTS 6,137,843 A    10/2000    Chennakeshu et al.

(Continued)

OTHER PUBLICATIONS

Valenti et al., "Iterative Multiuser Detection, Macrodiversity Combining, and Decoding for the TDMA Cellular Uplink" IEEE Journal on Selected Areas in Communications, vol. 19, No. 8 (Aug. 2001).

(Continued)

*Primary Examiner*—George Eng
*Assistant Examiner*—Un C Cho
(74) *Attorney, Agent, or Firm*—Nixon & Vanderhye PC (57) ABSTRACT

The invention relates to the field of signal processing for telecommunications, and concerns a method and receiver for processing a multi-user signal. In the method of the invention, a multi-user signal is processed by a receiver using an iterative receiver process including the steps of (a) receiving a signal transmission including a plurality of user signals on a TDMA channel, (b) detecting one or more user signals and determining transmission channel estimates for each said user signal, (c) deriving a soft signal for a first user by subtracting, if available, weighted representations of other user signals from the detected user signal of said first user, (d) calculating a-posteriori probabilities for each symbol comprising the soft signal, (e) refining said probabilities utilizing the transmission channel estimate for the first user in an iterative decoding algorithm, wherein a probability is either partially or fully decoded depending on the application of decoder convergence criteria, and (f) returning to step (a), (b) or (c) with the refined probabilities forming part of the weighted representations to be subtracted from detected user signals of other users. This method allows for efficient detection and decoding of multiple user signals by controlling the behaviour of an iterative decoding algorithm operating within an iterative receiver process.

26 Claims, 5 Drawing Sheets

U.S. PATENT DOCUMENTS

| | | |
|---|---|---|
| 6,351,216 B1 | 2/2002 | Frederick et al. |
| 6,581,182 B1 * | 6/2003 | Lee .......................... 714/795 |
| 6,760,360 B1 * | 7/2004 | Kawai ....................... 375/130 |
| 2002/0021747 A1 * | 2/2002 | Sequeira .................... 375/148 |
| 2002/0037061 A1 | 3/2002 | Learned |

OTHER PUBLICATIONS

Baccarelli et al., "A Novel Adaptive Receiver with Enhanced Channel Tracking Capability for TDMA-Based Mobile Radio Communications," IEEE Journal on Selected Areas in Communications, vol. 16, No. 9 (Dec. 1998).

Valenti et al., "Combined Multiuser Reception and Channel Decoding for TDMA Cellular Systems," Vehicular Technology Conference, 1998, VTC 98, 48th IEEE Ottawa, Ontario, Canada (May 18-21, 1998), IEEE U.S. vol. 3 (May 18, 1998), pp. 1915-1919.

Wang et al., "Turbo Multiuser Detection," Signals, Systems & Computers, 1998, Conference Record of the Thirty-Second Asilomar Conference on Pacific Grove, Ca. (Nov. 1-4, 1998) Piscataway, NJ, USA, IEEE, U.S. vol. 1 (Nov. 1, 1998), pp. 635-639.

Bauch et al., "Iterative Equalization and Decoding for the GSM—System," Vehicular Technology Conference, 1998, VTC 98, 48th IEEE Ottawa, Ontario, Canada (May 18-21, 1998), New York, NY, USA, IEEE, U.S. vol. 3 (May 18, 1998), pp. 2262-2266.

Douillard et al., "Iterative Correction of Intersymbol Interference: Turbo-Equalization," European Transactions on Telecommunications and Related Technologies, AEI, Milano, Italy, vol. 6, No. 5, (Sep. 1995), pp. 507-511.

* cited by examiner

METHOD AND RECEIVER FOR PROCESSING A MULTI-USER SIGNAL

This application is a continuation of Application No. PCT/AU03/00740, filed Jun. 13, 2003, the entire contents which is hereby incorporated by reference in this application.

FIELD OF THE INVENTION

The present invention relates to the field of signal processing for telecommunications, and concerns more specifically multi-user detection ('MUD') and signal processing methods and systems. In particular, it relates to a method and system for detecting and decoding multiple signals which occupy overlapping bandwidth and overlapping time resources. For example, it has application to narrowband mobile satellite communications systems, which use spot beam technology, and where high path loss and limited transmitter power are important factors.

BACKGROUND

Many efforts have been made in the field of telecommunications to increase the transmission capacity of limited bandwidth, in order to increase the number of simultaneous users able to occupy a common part of the frequency spectrum. In particular, CDMA techniques have been developed, with particular application to wideband radio signals. A number of solutions to the problem of interference suppression have been developed for CDMA systems, including iterative approaches to signal cancellation. This is relatively straightforward, as CDMA systems are inherently interference-resistant, due to the coding employed.

In satellite communications, the re-use of spectrum has been a secondary factor compared with power usage. However, as the number of users increases, an efficient method is needed to distinguish between the different signals. Generally, implementing suitable. systems has involved extremely complex solutions and prohibitively high costs. Accordingly, there is a need to overcome the disadvantages of the prior art and provide a new method for decoding multiple channels suitable for use in both narrow and wideband applications, and able to re-use frequency between adjacent spot beams in satellite systems.

SUMMARY OF THE INVENTION

In a first aspect, the present invention provides a method for processing a multi-user signal, the method comprising an iterative receiver process including the steps of:

(a) receiving a signal transmission including a plurality of user signals on a TDMA channel;

(b) detecting one or more user signals and determining transmission channel estimates for each said user signal;

(c) deriving a soft signal for a first user by subtracting, if available, weighted representations of other user signals from the detected user signal of said first user;

(d) calculating a-posteriori probabilities for each symbol comprising the soft signal;

(e) refining said probabilities utilising the transmission channel estimate for the first user in an iterative decoding algorithm, wherein a probability is either partially or fully decoded depending on the application of decoder convergence criteria; and (f) returning to step (a), (b) or (c) with the refined probabilities forming part of the weighted representations to be subtracted from detected user signals of other users.

The method of the present invention allows for efficient detection and decoding of multiple user signals by controlling the behaviour of an iterative decoding algorithm operating within an iterative receiver process. The control is an adaptive process, in this at each receiver iteration the iterative decoding is carried out in dependence on a measure of the receiver convergence. This affords minimum complexity of receiver architecture for signal convergence, by preventing the system 'locking on' to a user signal before sufficient convergence is indicated. The invention provides a new receiver architecture and technique which functions effectively in situations of multi-user interference. The novel approach thus allows users in adjacent beams of a satellite system to re-use the same frequency.

In broad terms, the concept of the invention provides a way of coordinating users, and can be used to take advantage of spatial, carrier frequency, time and signal polarisation to distinguish between signals from different users at the receiver. When compared with the prior art, it provides a relatively low complexity iterative cancellation and decoding technique, as well as a novel system receiver architecture.

The invention allows greater efficiency in the use of spectrum in satellite systems, allowing more users to simultaneously occupy the same bandwidth. It addresses therefore the increasing problem of bandwidth limitations on radio spectrum in satellite communications systems, set by international agreements. Conversely, as satellite systems with higher power and with greater sensitivity become available, the invention provides the capacity to support greater numbers of users, allowing the limited bandwidth to be used more efficiently to match more effectively the increasing power.

The invention, then, has particular application in narrowband TDMA with reservation/channel assignment procedures or random access techniques (eg: ALOHA), in satellite line-of-sight propagation environments, and in power limited systems.

The system of the invention can operate with arbitrary waveforms (in narrow or wideband). Unlike known narrow band multi-user systems, interference suppression is accomplished via the canceller, rather than using different channel interleavers. In addition, the invention employs iterative cancellation of partially overlapping signals with identical reference sequences (e.g. unique words-UW).

Preferably, the method further comprises the step of either continuing further steps or producing a hard signal for the first user and discontinuing further steps depending on the application of receiver convergence criteria to the decoded probabilities.

During the first iteration of the iterative receiver process, the decoder convergence criteria may include comparing the interference on the detected user signal for the first user with an interference threshold determined by estimating the noise equivalence of interference on the detected user signal due to other user signals, with the probabilities being fully decoded if the interference is below the interference threshold or partially decoded if the interference is above the interference threshold.

The decoder convergence criteria may also include adaptively adjusting a threshold of a stopping criteria, a probability being fully decoded when the application of the stopping criteria to a probability results in a value less than the threshold and partially decoded when the application of the stopping criteria results in a value greater than the threshold.

Preferably, the stopping criteria utilises the refined probabilities from a previous iteration of the iterative decoding algorithm. The stopping criteria may for example be the sign change ratio stopping criteria.

Alternatively, the decoder convergence criteria utilises a stored value of the optimal number of iterations of the iterative decoding algorithm for any particular iteration of the iterative receiver process. The stored values may, for example be calculated from investigation of the convergence behaviour of the iterative decoding algorithm and/or the iterative receiver process. Preferably, the investigation includes analysing the exchange of mutual information between the output of step (c) and step (e) during an offline simulation of the iterative receiver process.

Typically, steps (c) (d) and (e) are carried out in parallel for each of the plurality of users detected in step (b) and the refined probabilities for each user are combined with updated channel estimates to form the weighted representations of user signals used in a subsequent iteration of the iterative receiver process.

The updated channel estimates for each user signal generally comprise an estimate of characteristics selected from the group of timing, interference, frequency, amplitude, phase and interference.

The iterative decoding algorithm is preferably a turbo decoding algorithm.

In a second aspect the present invention provides a receiver for processing a multi-user signal in an iterative receiver process the receiver including:

(a) receiver means for receiving a signal transmission including a plurality of user signals on a TDMA channel;

(b) a detector for detecting one or more user signals and determining transmission channel estimates for each said user signal;

(c) an interference canceller for deriving a soft signal for a first user by subtracting, if available, weighted representations of other user signals from the detected user signal of said first users;

(d) means for calculating a-posteriori probabilities for each symbol comprising the soft signal;

(e) a digital signal processor for running an iterative decoding algorithm to refine the probabilities by utilising the transmission channel estimate for the first user, wherein a probability is either partially or filly decoded depending on the application of decoder convergence criteria; and (f) means for inputting the refined probabilities to the interference canceller to form part of the weighted representations to be subtracted from detected user signals of other users.

Said receiver may be a power-limited satellite-mounted receiver. The invention is equally applicable to ground based recess.

Preferably, the receiver further comprises means for producing a hard signal for the first user and discontinuing the iterative receiver process depending on the application of receiver convergence criteria to the decoded probabilities.

During the first iteration of the iterative receiver process, the decoder convergence criteria typically includes comparing the interference on the detected user signal for the first user with an interference threshold determined by estimating the noise equivalence of interference on the detected user signal due to other user signals, with the probabilities being fully decoded if the interference is below the interference threshold or partially decoded if the interference is above the interference threshold.

The decoder convergence criteria may also include adaptively adjusting a threshold of a stopping criteria, a probability being fully decoded when the application of the stopping criteria to a probability results in a value less than the threshold and partially decoded when the application of the stopping criteria results in a value greater than the threshold.

For example, the stopping criteria, may utilise the refined probabilities from a previous iteration of the iterative decoding algorithm.

Optionally, the stopping criteria is the sign change ratio stopping criteria.

Alternatively, the decoder convergence criteria utilises a stored value of the optimal number of iterations of the iterative decoding algorithm for any particular iteration of the iterative receiver process. The stored values may be calculated from investigation of the convergence behaviour of the iterative decoding algorithm and/or the iterative receiver process. This investigation may include analysing the exchange of mutual information between the output of the interference canceller and the iterative decoding algorithm during an offline simulation of the iterative receiver process.

Typically, the receiver includes a plurality of calculating means and digital signal processors for the parallel refining and decoding of a posteriori probabilities for each of the plurality of users detected by the detector.

The receiver may also include a channel estimator for providing updated channel estimates for each user and combining the updated channel estimates with the refined probabilities to form the weighted representations of user signals used in a subsequent iteration of the iterative receiver process.

Typically, the updated channel estimates for each user signal comprises an estimate of characteristics selected from the group of timing, interference, frequency, amplitude, phase and interference.

The iterative decoding algorithm is a turbo decoding algorithm.

The method and receiver, then, utilises an iterative subtractive approach to interference cancellation. Accordingly, on each iteration, all input signals are examined to identify new, previously undetected users. Otherwise, all signals and users are processed in parallel. In some embodiments the residual interference left after cancellation is estimated and the interference hold based on the residual interference. Cancellation can be performed in the order of decreasing signal strength, determined by the step of channel estimation. Each signal is successively demodulated, reconstructed and subtracted from the total received signal.

In one embodiment, soft subtraction is employed, the weighting for the subtraction being accomplished linearly. In such an approach, the sum of the candidate bit probabilities being equal to one. The interference is estimated based on the partially decoded users and weighted with the channel estimates.

The invention also provides a method and device for controlling decoder iterations to lead to convergence in a multi-user receiver architecture, comprising use of statistical analysis, such as EXIT chart analysis, or mutual information transfer chart analysis.

The invention further provides a device and method for controlling decoder iterations in a multi-user receiver architecture, comprising use of an adaptive controller using measurement of metrics based on the soft output of the decoder and channel estimation to estimate the residual interference present in the signals. This estimation is carried out by examining likelihood ratio distributions and estimated error ratios. The estimated residual interference is used to control the partial decoding and signal parameter estimation processes.

An aspect of the receiving method concerns the control of the decoder iterations in a multi-user architecture. Statistical metrics as used in EXIT chart analysis technique, are used to verify convergence for a prescribed number of decoder iterations.

BRIEF DESCRIPTION OF THE DRAWINGS

To illustrate the invention and how it may be put into effect, reference will now be made to the accompanying drawings, which represent a preferred non-limiting embodiment. In the drawings.

DETAILED DESCRIPTION OF THE DRAWINGS

In this specification, unless the context otherwise provides, the following terms are used with the following definitions:

'convergence'—implies an iterative algorithm has reached a locally stable value;

'partial decoding'—employing an optimal number of iterations (as decided by application of suitable criteria) with respect to convergence and complexity for an iterative decoding algorithm, for a particular iteration of a multi user receiver;

'fully decoding'—employing a number of iterations to provide the best estimate of a value calculated by an iterative decoding algorithm.

Further, in this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

Multiple User Decoding Strategies

Figure 1:
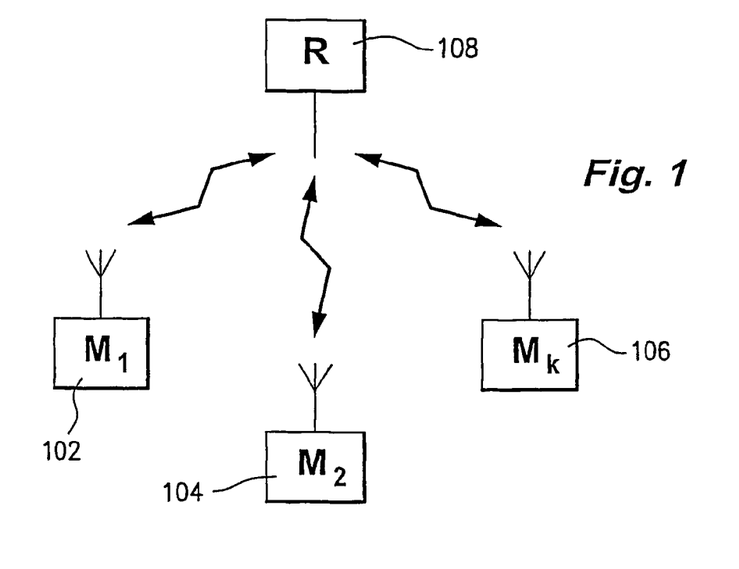
FIG. 1 diagrammatically illustrates a narrowband multi-user signal receiver.

The situation illustrated in FIG. 1 includes a plurality of users $M_1$-$M_k$ 102-106 communicating with a satellite receiver 108 on a single time division multiple access TDMA channel, or on two or more closely adjacent channels. The signals received from each respective user include interference from the other users, and suppressing such interference is an essential step in effective receiver performance. Rather than making separate decisions on each user's codeword, a multi-user decoder makes a joint decision on all the users' codewords given the received sequence. The fundamental issue in multi-user decoding is not the amount of spectrum spreading, but the amount of cross-correlation between the users 102-106. It is to be noted that joint detection/single user decoding algorithms are of interest both in cases where co-channel interference is severe, and where it is not.

Another issue in multiple-user decoding in the scenario illustrated in FIG. 1 is channel estimation. Previous narrowband multi-user receivers developed or postulated either assume or require perfect channel knowledge. The present invention makes no such assumption.

The prior art provides a range of multi-user decoding strategies for cancelling co-channel interference that provide varying levels of performance and require varying levels of implementation complexity. Depending on the nature and levels of co-channel interference, different types of receivers find different areas of applicability.

Maximum Likelihood Joint Decoding

The optimal joint decoder minimises the probability of decoder error. This corresponds to the maximum likelihood decoder, which outputs:

$$\hat{c}_1, \hat{c}_2, \ldots, \hat{c}_k = \mathrm{argmax} Pr(\{y[i]\}_{i=1}^N \mid c_1, c_2, \ldots, c_k)$$

where $c_1, c_2, \ldots, C_k$ represent the transmitted codeword, $\hat{c}_1, \ldots \hat{C}_k$ represent the estimated codeword, and y is the received signal vector of block (codeword) of length N.

In general, this has complexity that increases exponentially with both the number of users and the codeword length. For convolutionally encoded data; joint decoding corresponds to Viterbi decoding on a super-trellis whose states are the concatenations of the individual user states. Optimal decoding is therefore feasible for only a very small number of users. Furthermore, in the case where turbo codes are used, the required super-trellis becomes too cumbersome to be practical. The concept of optimal decoding is, however, useful in providing a benchmark against which other methods may be measured.

Interference Cancellation

With careful selection of the users' code rates, or equivalently, their transmit power, successive cancellation of decoded data streams can approach the performance of the optimal decoder. In order for this scheme to be practical, however, the users' powers must be tightly controlled. Thus, interference cancellation is better suited to situations where power control can be implemented.

Joint Detection, Independent Decoding

Because of the high complexity of optimal joint detection, it is necessary to try to design sub-optimal receivers with lower complexity. The key trade-off is performance versus complexity. One approach to reducing complexity is to separate the problems of detection and decoding. The receiver of the invention makes joint decisions on each received signal (ignoring the constraints due to coding). The resulting signal streams are then independently decoded. Such a strategy results in minimal change to existing architectures.

Multistage Detection

Multi-stage detectors use a process of successive cancellation of the uncoded bits. Cancellation can proceed in serial or parallel. Multistage detectors can be classified as linear or non-linear, according to whether they subtract linear or non-linear functions of the already detected symbols.

Iterative Decoding

The preferred embodiment of the present invention implements a class of sub-optimal iterative non-linear decoding strategies. The high complexity of optimal decoding arises mainly from the fact that the constraints introduced by coding and channel effects must be processed jointly for all users. In contrast, iterative non-linear methods aim to iteratively reconstruct from the channel output each user's transmitted waveform using marginal posterior distributions. Code multiple-access system can be considered as concatenated coded systems. The received signal is constrained both by the individual channel codes and by the structure of the multiple-access channel. The basic principle behind the design of the iterative multi-user receiver of the present invention is to separate the problem of inter-user dependence (due to the multiple-access channel) and time dependence (due to channel coding and inter-symbol interference).

A joint detection module calculates posterior distributions on the data incorporating multiple-accessing constraints, but ignoring coding constraint. The posteriors are used as priors by individual decoders for each user, which independently produce posteriors on the user data taking into account only the constraints due to the codes, and ignoring the multi-accessing constraints. These posteriors are then fed back to the joint detection module, and so on. The receivers are non-linear due to the incorporation of decoders in the decision process, and due to the fact that the joint detection module may itself be a non-linear device. In particular, the reconstruction of one particular user's waveform from the common channel output is obtained by cancelling in a non-linear way the estimated contribution of all other users. Such a technique results in particularly low complexity implementations.

One of the challenges in multi-user receiver design is in the size of the signaling constellation. Indeed, even if the number of interfering users is small, the size of the constellation appears to be the limiting factor for applying optimal joint detection techniques. In such cases, the cancellation-based scheme is dearly preferable to methods whose complexity is dominated by a term exponential in both the number of bits transmitted per symbol and the number of users. In fact, for a D-ary constellation and K users, the complexity of those schemes is $O(D^k)$. Results show that the low-complexity iterative cancellation approach can be applied successfully to single user turbo-equalisation for 16-and 64QAM. Another point of note is that known non-linear iterative decoding schemes generally require independent interleaving of each user's data (usually taking place after the encoder). It has indeed been shown that the presence of an interleaver is a necessary condition for any successive cancellation technique to converge. Another point to be considered in this problem is that of channel estimation. The inventors have shown that including channel estimation inside the iteration can yield significant performance gains. In this way, each user's channel estimate is improved as the data estimates improve.

Additionally, prior approaches have generally applied a single channel and signal parameter estimation via a training sequence, using that channel estimation for all packets and all iteration steps, and have generally used a known raining sequence for each TDMA burst. One embodiment of the present invention carries out channel estimation on a packet-by-packet basis, for each iteration, and using a reference sequence (eg a UW) present in the packet. This updating of the channel estimation on each pass, if necessary, can lead to significant improvement in receiver performance.

Iterative Multi-User Decoding

We now focus on the multi-user receiver architecture according to the present invention. The architecture is flexible enough to provide a range of solutions of different complexity for different applications. Furthermore, there are a number of optional features that can be incorporated, depending upon the changes permitted to the system requirements.

Broadly speaking, the system of the invention achieves interference suppression by first detecting and decoding the received signals in multiple stages, and then cancelling the unwanted signals. This process is carried out iteratively, and this approach has application to interferers that are asynchronous to the wanted signal.

Figure 2:
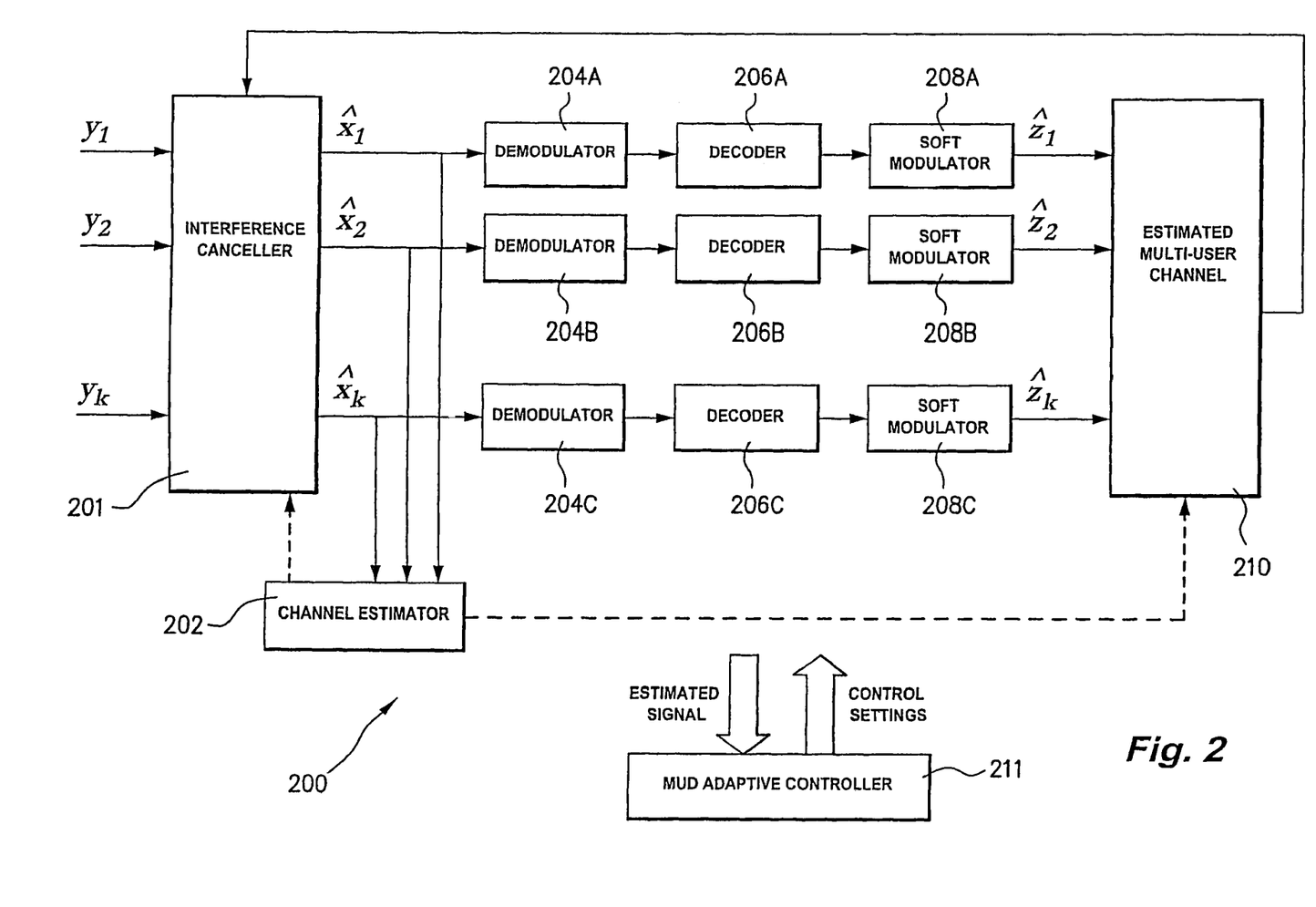
FIG. 2 illustrates an exemplary iterative architecture and adaptive control of the receiver illustrated in FIG. 1.

FIG. 2 shows an exemplary architecture of a receiver 200 suitable for decoding multiple users, signals $y_1, y_2, \ldots y_k$, in accordance with the present invention. Performance tests have shown this architecture to yield near optimal performance (approaching single user) under certain conditions and linear increase in complexity with increasing numbers of users. The architecture consists of a feedback structure comprising an interference canceller 201, channel estimator 202, soft demodulator 204A-204C, soft output decoder 206A-206C, soft modulator 208A-208C and estimated multi-user channel apparatus 210.

The receiver 200 comprises multiple parallel processor arms as shown, each receiver arm serving to converge on a respective user (see below). Each component of the receiver can be constructed using existing hardware, as will be understood by those skilled in the art. In particular, decoders 206A-206C comprise digital signal processing hardware suitable for running an iterative decoding algorithm. Broadly, the principle of operation is to iteratively improve soft estimates of multiple users simultaneously, where the users' signals occupy overlapping channel time/bandwidth resources. With no a priori knowledge of users, the number of active receiver arms can vary through successive iterations, as weaker signals become apparent through progressive interference suppression (and the architecture then includes a further receiver arm).

The interernce canceller 201 takes multiple received signals $y_1, y_2, \ldots Y_k$, acquires signal lock (acquisition), and preferably then filters to reduce the effects of noise. On subsequent iterations, the estimated multi-user channel vectors are cancelled from die received signals to reduce interference. Effectively, the interference canceller removes multiple access interference with respect to each possible user. Acquisition occurs through joint detection of users from each of the signals.

As mentioned above, for each user there is a processing arm consisting of soft demodulator, decoder, and soft modulator. This combination of components provides a soft weighted estimate of each user's signal. The partial soft input/soft output decoder allows control over the use of time dependent signal constraints from zero to complete. This is accomplished (see below) by either fully or partially decoding the output from the soft demodulator depending on convergence criteria. The deferral of fill output decoding output avoids the problem of false locking onto a combination of users resulting from incomplete interference cancellation.

The channel estimator 202 provides estimates of the radio link parameters necessary for demodulation, e.g. timing, frequency, amplitude and phase of a coherent demodulator. It provides estimation of the relative level of each user from all signals.

The estimated multi-user channel block combines the soft modulated single user vectors to generate estimates of each of the received signals, including data values and radio link effects (except additive noise). These are then used by the interference canceller to cancel interference from the received signals at each iteration of the algorithm.

On the last iteration hard decisions are output to reflect the most likely transmitted data bits for each user, thus a final decision is made on the most likely transmitted data for each user. A hard decision will be output for each user and the receiver iterations, indicated by the return arrow in FIG. 2, are terminated once a hard signal can be output for each user. A hard signal can be produced for an individual user once the output from the soft demodulator has been fully decoded.

However, as a decoded soft signal for every detected user is required during subsequent receiver iterations, the outputting of the hard signal is deferred until all users have been fill decoded by the decoder.

Figure 3:
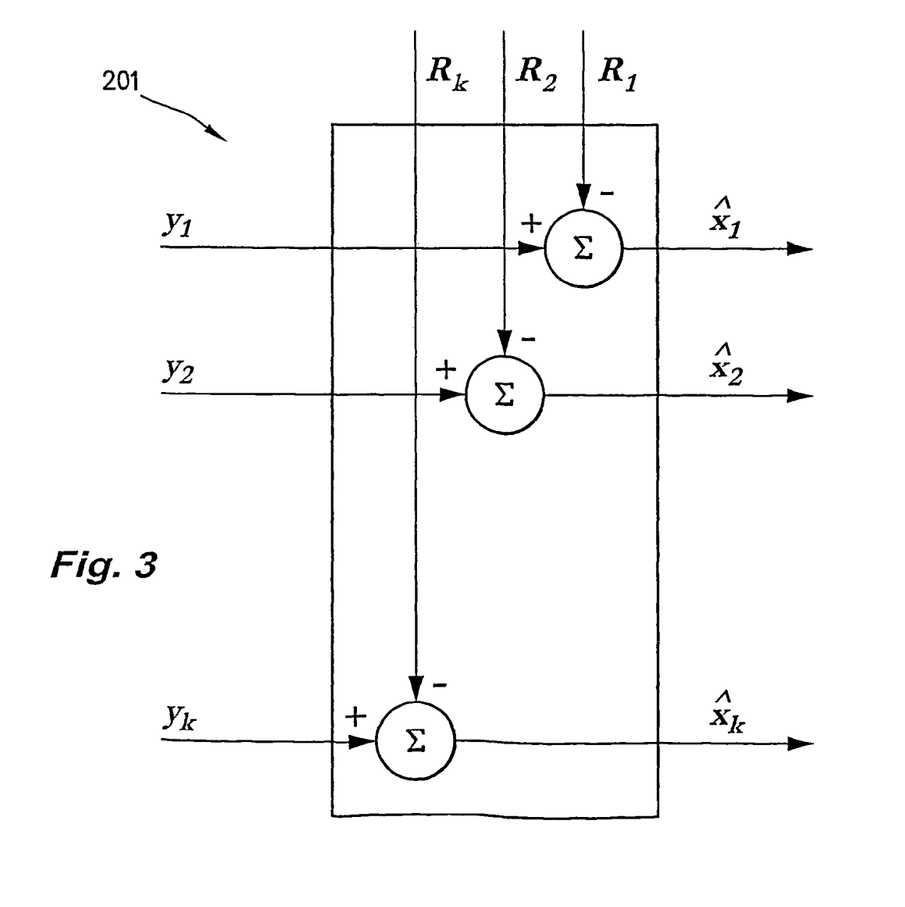
FIG. 3 depicts a schematic illustration of an exemplary interference canceller from the receiver illustrated in FIG. 2.

FIG. 3 depicts the operation of an exemplary cancelling module 201. This component does not operate on the first receiver iteration, as on the first iteration the interference estate is zero and so no cancellation can occur. For subsequent iterations, the cancelling module is a non-linear cancellation device where the soft estimate $\hat{x}_k[i]$ of the coded and. modulated symbol for user k is obtained by subtracting from y[i] the average contribution of other users (where the average is calculated according to the posterior distributions from the previous iteration). Note that in order to cancel each user's contribution to the received vector, estimates of the users' channels are required.

Prior approaches to iterative signal estimation approaches have employed processing steps such as hyperbolic tangent devices, which are used to control how much of the estimated interference is actually used in the cancellation at each iteration. Such methods require an estimation of absolute power to be made at the antenna, as without such prior knowledge the algorithm may be ineffective. In contrast, in the present invention, this soft decision step is implemented by way of the non-linear device described. In this approach to the weighting, the sum of the candidate bit probabilities is equal to one. This contrasts with a device such as the hyperbolic tangent device referred to above, wherein this sum total is artificially reduced to compensate for the inaccuracy of the estimated signal. As the method of the invention does not involve locking into the signal on initial receiver iterations, it is not required to compensate for initial inaccuracies.

The operation of the canceller 201 is as follows:
Field $y_1, y_2, \ldots, y_k$ are received signals $$R_p = \sum_{i=1:K\backslash i\neq p} \rho_{pi} \hat{z}_i$$

p=1, 2, ..., K $z_i$ is the output of the $i^{th}$ soft modulator after reapplying the channel parameters.

$p_{pi}$- relative interference value of the $i^{th}$ user interfering with user p.

$\hat{x}_p = y_p - R_p$

Thus, the exemplary embodiment depicted in the figures involves an iterative multi-user device for multi-user decoding for narrow-band satellite services. The general structure of the components of the receiver illustrated in FIGS. 2 and 3 will now be described in further detail The vector channel output y[i] from the estimated multi-user channel apparatus 210 is processed in subsequent iterations by the following devices:

1. Interference Canceller: This device 201 produces soft estimates of the coded and modulated symbols $x_k(i)$ in the manner described above. It effectively separates the users based on each user's marginal a-postriaori probability distribution. At the first iteration, there is of course no available information for approximating these marginal probabilities (see FIG. 3). However, on subsequent iterations this information is available to the interference canceller 201 from the previous receiver iteration.

2. Soft Demodulator: The soft demodulator 204A-204C may include a filter or combination of filters (not shown) to reduce noise and interference. This component produces the a-posteriori probabilities $PR(d_k[i]|\hat{x}_k[i])$ for each B taken from the signal constellation (this component is already required for single user soft-decision turbo decoding), where $d_k[i]$ represents the uncoded bits. 3. MUD Adaptive Controller: The adaptive controller 211 adaptively sets the thresholds applicable to the convergence criteria used to determine convergence of the a-posteriori probabilities. and also controls the signal parameter estimation processes.

Essentially, at the end of each iteration of the iterative decoding algorithm and/or the multi-user detection method the relevant convergence criteria is applied, with the application of the convergence criteria producing a particular value. A subsequent iteration will then only occur when the value is greater than the threshold set by the adaptive controller. It will thus be realised that whether an a-posteriori probability for a symbol is fully or partially decoded can be controller by a manipulation of the relevant prescribed threshold.

A number of suitable convergence criteria are set out below, including the method of estimating the interference on a user signal and comparing the inference to a prescribed threshold, the threshold being determined by measuring the noise equivalence of the interference on the user signal due to other user signals. A probability will then be partially decoded when the interference is greater than the interference threshold and fully decoded when the interference is less than the interference threshold. The estimation is carried out by measuring the variance of the signal or by other approaches such as examining log likelihood ratio distributions and estimated error ratios.

Figure 4A:
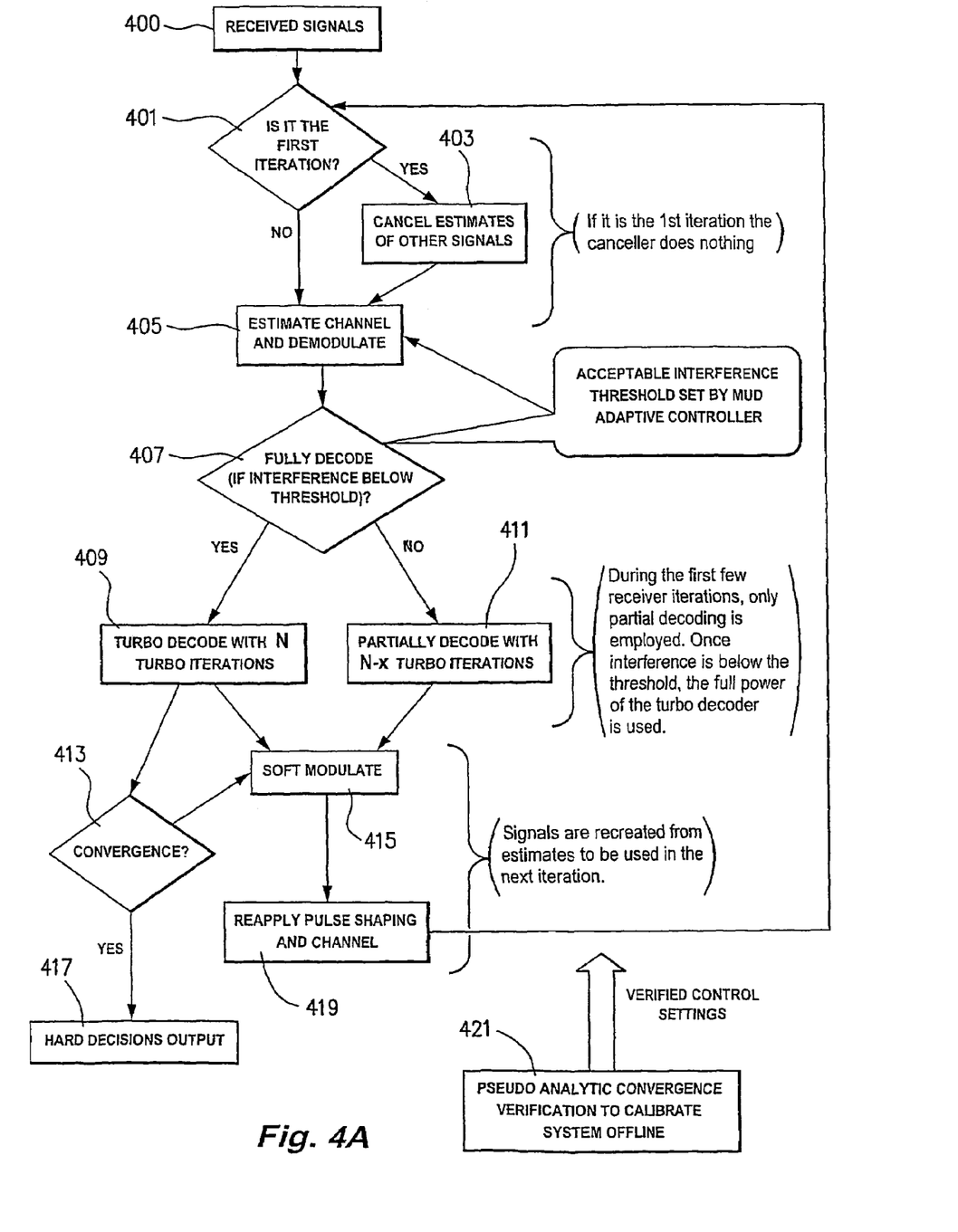
FIG. 4A shows a flow chart depicting the multi-user signal processing method of the invention utilising the noise equivalence of interference due to other user signals as convergence criteria.

At each iteration, the control settings to be applied in setting the threshold are updated. Alternatively, the adaptive behaviour may be determined by experimental optimisation through pseudo-analytical methods (statistical techniques-see below) such as 'EXIT' (EXtrinsic Information Transfer) Chart analysis or mutual information transfer chart analysis. Another alternative is to apply stopping criteria, such as a sign change ratio criteria (see below). 4. Soft turbo decoder: Refines the a-posteriori probabilities of the coded bits by taking into account the knowledge of the turbo code. As noted above the signals are only partially decoded during the first few receiver iterations in order to prevent the estimated signal from locking in to an incorrect value (ie converging to a false lock, an incorrect codeword nearest the transmitted signal—plus noise, plus interference). 5. Soft modulator: The soft modulator 208A-208C produces the conditional, expectation $E[x_k[i]]$ of the coded and modulated symbols (according to the posteriors calculated by the decoders). These average symbols are further fed back to the multi-user detector for the next iteration. 6. Channel estimator: The channel estimator 202 updates the channel estimate for each user. Note that this device takes as input the output of the interference canceller 201 and feeds each user's signal parameters to the estimated multi-user channel 210 and the interference canceller 201. This shows that the channel estimator is one of the key points for convergence of such an iterative system. Note that if enough training symbols are present, or at high enough signal to noise ratios, the channel estimates from the initial iteration maybe sufficiently accurate. with reference to FIGS. 4A and 4B (in which the same reference numerals have been used to refer to directly equivalent steps) the operation of the multi user detection method of the invention is illustrated, employing alternative convergence criteria. In the method of Figure 4A, a signal transmission is received (400) at the receiver, the signal including a plurality of user signals. A test is performed (401) as to whether it is the first iteration or not. If not, estimates of other user signals are cancelled (403) from the signal of the first user. On the first iteration there are no estimates of other users available so the canceller does not operate. On subsequent iterations a weighted representation of the other user signals is subtracted from the signal of each user of interest and a soft signal is thus produced.

The channel estimate for each user is obtained by known methods (405) and the soft signals are demodulated to obtain the a priori probabilities for each symbol comprising the soft signal. The interference threshold is then set by the adaptive controller to determine whether probability is fully or partially decoded (407). Where the probability is partially decoded (411) it is iterated through N-x iterations of the to decoder, where $0 \leq x \leq N$. Similarly, where the probability is fully decoded (409) it is iterated through N iterations of the turbo decoder. The partial decoding is controlled by controlling the number of turbo decoder iterations, where the first few receive iterations have fewer decoder iterations. As FIG. 4A schematically shows, the number of turbo iterations N-x represents a decreasing x in successive iterations, until the full power of the to decoder is employed.

Where only partial decoding occurs, a soft signal produced from the refined probabilities of the decoder is soft modulated (415), with pulse shaping and channel estimation being applied to the modulated signal (419). This signal then forms part of the weighted estimate to be subtracted from other user signals in subsequent iterations.

Where a probability is fully decoded a test is performed (413) as to whether all signals have been fully decoded. Where the test is positive a hard signal is output (417) for each user and further processing is terminated.

As is further described below, the convergence behaviour of the iterative decoding algorithm (407) can be investigated offline by simulating the operation of an actual receiver. The results of the investigation can then be used (421) to calibrate the adaptive controller.

Figure 4B:
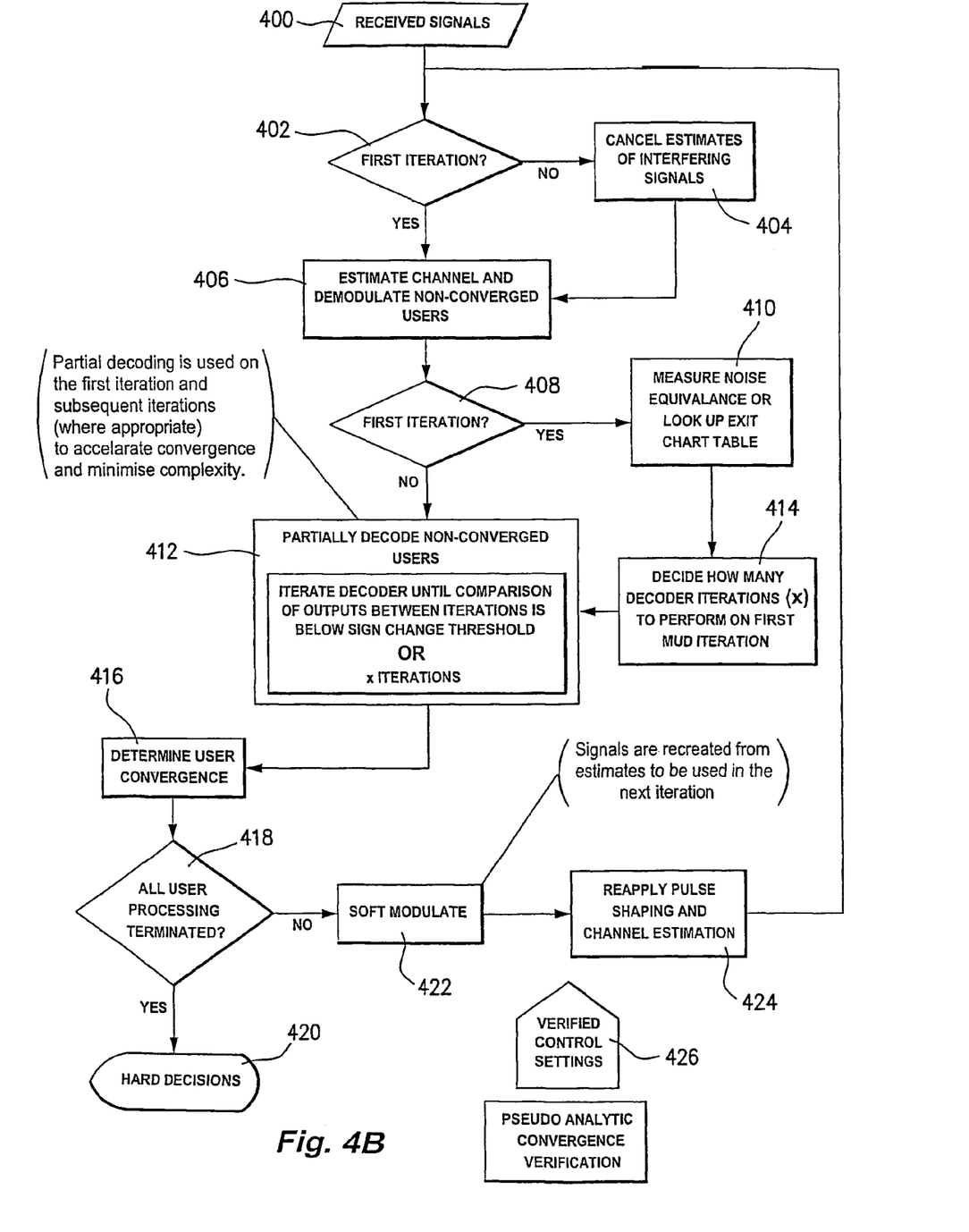
FIG. 4B shows a flow chart depicting the preferred embodiment of the multi-user signal processing method of the invention utilising convergence criteria including Sign Change Ratio and values from a look up table.

FIG. 4B illustrates an alternative and preferred embodiment of the method of the invention. The signals are received (400) and passed to the Interference Canceller (404). If it is not the first receiver iteration (402), the estimates of interfering signals are cancelled from the received signals.

Channel estimation is performed (406) and the signal of each non-convergence user is demodulated. The operation of the iterative decoding algorithm differs between the first and subsequent receiver iterations. On the first iteration (408), convergence criteria is applied (410, 414) with the relevant threshold being set by the adaptive controller to determine the optimal number of decoder iterations. As noted above the convergence criteria can include measuring noise equivalence (ie approximating the channel interference as noise) or alternatively by directly obtaining the optimal number of decoder iterations from a lookup table. A further convergence criteria includes the application of a stopping criteria such as the sign change ratio stopping criteria, described further below.

The signals are decoded (412) by iterating the decoding algorithm through the number of iterations (as determined at 414) or until application of the stopping criteria shows that convergence has occurred. In either case, the adaptive controller will set the threshold for the stopping criteria or deliver the relevant number of iterations to either partially or fully decode a user.

User convergence is determined (416) and where all users are fully decoded (418) a hard signal is output (420) and no further processing occurs. Alternatively the decoded signal is modulated (422) and pulse shaped (424) and a subsequent iteration is commenced (from 402).

It will thus be realised that the adaptive controller controls the decoding process to ensure convergence with minimum complexity on any particular iteration of the iterative receiver process. The behaviour of the decoder under different conditions can be investigated to arrive at a decoder profile. Several profiles can be computed offline for different scenarios of number of users and relative interference, as schematically represented in FIGS. 4A and 4B by the pseudo-analytic convergence verification process (421, 426). In actual operation the receiver can then identify the closest scenario and employs the appropriate partial decoder profile. This approach of storing the optimal number of decoder iterations for any particular iteration of the multi user detection method operates as a pseudo-analytical tool—a 'look-up' table (LUT) (410)—to decide at each receiver iteration the partial decoding required.

Convergence behaviour can be investigated by EXIT chart analysis, which is discussed further in 'Convergence Behavior of Iteratively Decoded Parallel Concatenated Codes'; Stephan ten-Brink; IEEE Transactions on Communications; Vol. 49, No. 10; pp 1727; October 2001, which is incorporated by reference in its entirety. The EMT chart analysis can be viewed as a software gauge attached to the soft outputs of the decoder, enabling determination of convergence by determining the number of turbo iterations.

Convergence behaviour may also be investigated by making on-line measurements of the decoder output. There is, of course, a trade-off between complexity and performance of the different techniques. In the case of the LUT method, the average behaviour of the MUD system described is investigated off-line via the EXIT Chart analysis tool. Mutual information files are generated for both channel coding and Multi User Detection (MUD) modules. These files form a data base which is then processed via use of an analysis tool. The result of this processing is the number of MUD iterations, M, and Turbo iterations Nm for each MUD iteration ma=1, ..., M for all possible environments.

The MUD LUT is built according to criteria which maximise the convergence region, whilst minimising overall complexity. Such a set of iteration values is referred to as a schedule and the path taken by the receiver system, in the EXIT chart, is referred to as a trajectory. Since there is the same forward error control FEC, decoding and modulation for all users, symmetric interference (in the case where the LUT is used), and parallel processing in the MUD, the trajectory followed by each user is identical.

The rule used for choosing the turbo iteration to recommend is to pick the lowest iteration number that result in an output mutual information that is within a threshold of the output mutual information corresponding to the highest iteration number. Mathematically stated, if the values of output mutual information at iteration n=1, ..., N are $I_n$ then the iteration selected, denoted $\hat{n}$, is $$\hat{n} = \min\{n : I_n > (\max(\{I_n : n=1, \ldots, N\}) - \lambda)\}$$

where $\lambda$ is the mutual information tolerance level.

Figure 5:
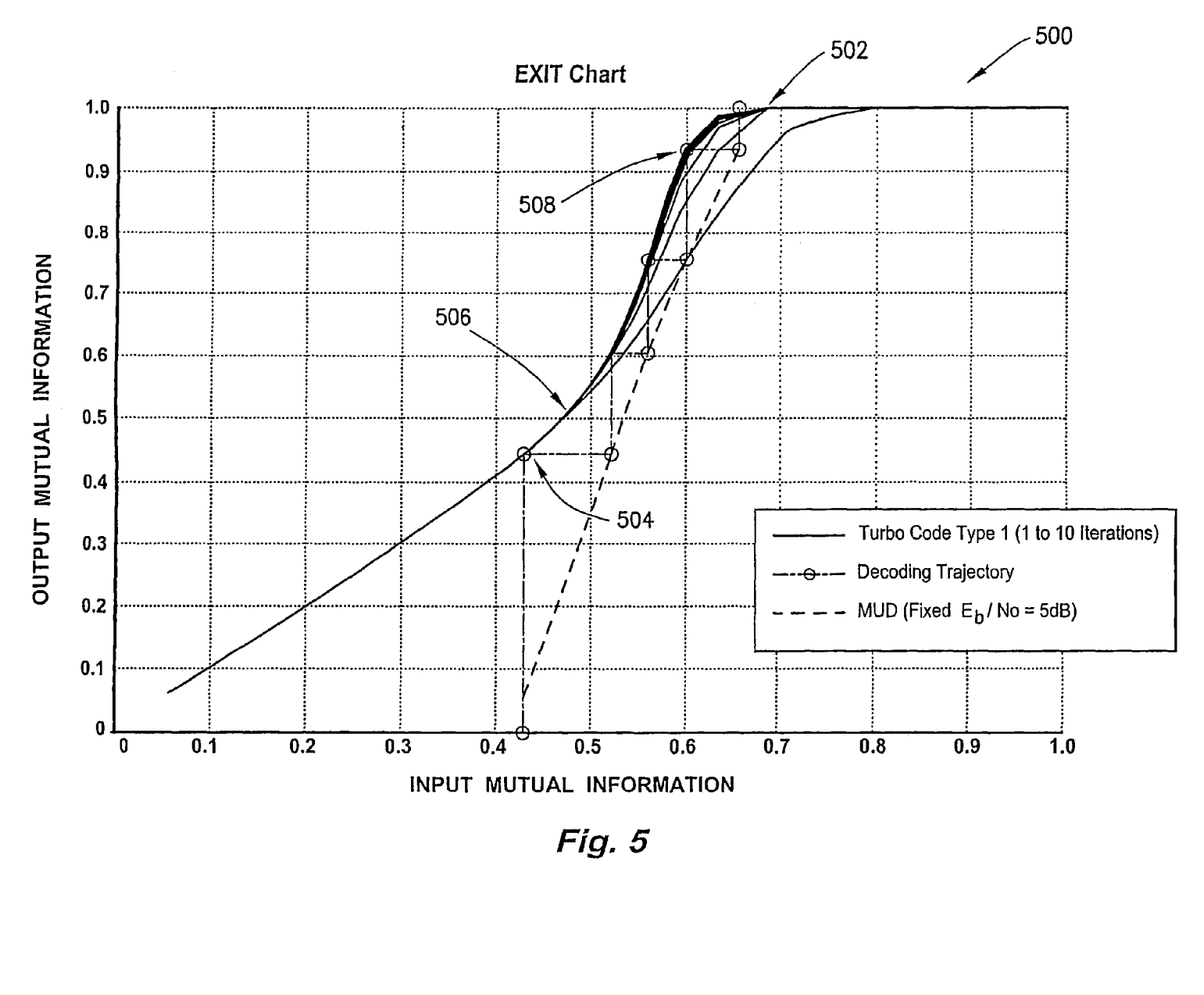
FIG. 5 illustrates an EXIT chart from which values of the look up table shown in FIG. 4B may be derived.

An example of an EXIT chart and how the optimal number of turbo iterations for any particular MUD iteration can be derived therefrom is given in FIG. 5 with convergence occurring at the leftmost crossing points 502 where the mutual information=1. From the EXIT Chart 500 it is apparent that on the first MUD iteration 504, no real advantage is gained by employing 10 turbo iterations, as opposed to 1 iteration. Therefore, in terms of complexity, the probability is only partially decoded on the first iteration. However, at the 4$^{th}$ MUD iteration 508 dose to 10 turbo iterations allow the decoding trajectory to obtain convergence with an acceptable complexity and therefore the adaptive controller may allow a probability to be silly decoded on the fourth MUD iteration.

An alterative convergence criteria to the off line EXIT chart analysis is to employ a stopping criteria with the adaptive controller setting the relevant threshold value to provide for partial or full decoding. In the case of the sign change ratio (SCR) stopping criteria the number of sign changes in the information Bit estimate returned by the decoder for a block of length L between iterations i and i−1. This method is derived from the 'cross entropy criterion' method. Once the sign change ratio SCR (number of sign changes divided by the packet length) falls below the threshold, the turbo decoding iterative process can be terminated with minimal degradation; the threshold is determined from simulations and set by the adaptive controller The smaller the threshold, the smaller the amount of BER degradation. This method can be used for turbo decoder iteration control, but is also used to control MUD iteration, based on the final information bit estimates output by the turbo decoder after N iterations.

In MUD controller mode, the sign change metric is used to determine when to cease subsequent decoder visits for the user of interest. The function is called once at the end of each MUD iteration. For each user the metric is checked according to the sign change metric stop criterion. If stop conditions are met for any user a value of 0 is returned and no further MUD iterations are performed for this user. It is to be noted that this does not prevent other users from continuing to iterate as appropriate. The receiver uses a combination of the LUT and SCR approaches to provide the best performance for the least complexity.

The convergence properties of the method of the present invention have been analysed by the inventors. This analysis has showed that the receiver architecture, when combined with appropriate probabilistic component algorithms, allows very high spectral efficiencies to be achieved. Experiments have suggested spectral efficiency up to approximately 10 bits per second per Hertz (bps/Hz), compared with conventional transmitter receivers that achieve 1-2 bps/Hz, with only a small increase in transmitter power (less than 1 dB). Studies of the effects of the system of the invention on acquisition and decoder performance have demonstrated that this approach provides particular advantages when acquiring a weak user signal in the presence of a much stronger interfering signal.

The technique described above involves the strongest users (signal) on each arm of the receiver being detected, and other interfering users cancelled from it with the appropriate weighting. Each user's signal is therefore taken from only one detector arm, this approach being referred to as 'selective combining'. It is to be noted that the invention can also be applied to other post-detection combining techniques such as 'maximal ratio combining', where the contributions from each user are combined for each of the receiver arms. Combining techniques are further described in "Mobile Communications Engineering, Theory and Applications", W. C. Y. Lee, McGraw Hill, 1997, which is incorporated by reference in its entirety.

The present invention has direct commercial application to a number of different areas of application, including:

Return link frequency reuse with overlapping spot beams. System dependent and implemented at the earth station, enabling a 2× to 7× increase in return channel bandwidth on spot beam satellites, depending on configuration.

Forward and return link spectrum overlap. System dependent and implemented at the user terminal, enabling up to a 1.25× increase in forward channel bandwidth by reducing carrier guard band requirements.

Forward link frequency reuse with multiple satellites. System dependent and implemented at the user terminal and earth station, enabling a 25 to 50% increase in available channel bandwidth when multiple satellites are deployed in the same region to increase capacity.

Forward link constructive combination of multi-path signals. Integration of low cost antenna elements, multiple-receive RF chains with partial decoding technology to enhance apparent gain through positive combination of wanted signals and cancellation of interfering signals, providing a significant increase in capacity.

Radio Access Scheme with Random Access. Enables the increased throughput of up to (at least) times (×) 1.3 in a random access scheme such as Slotted Aloha, by reducing the packets having to be retransmitted due to collisions.

The invention has been described with reference to conventional TDMA-type signals, but it is to be understood that it has application also to other types of signals. For example, the signals could include uncoded training symbols to assist in channel estimation. Further, the different signals could be transmitted in different size packets or asynchronously.

Modifications and improvements to the invention will be readily apparent to those skilled in the art. Such modifications and improvements are intended to be within the scope of this invention.

The invention claimed is:

1. A method for processing a multi-user signal, the method comprising an iterative receiver process and including: (a) receiving a signal transmission including a plurality of user signals on a TDMA channel; (b) detecting one or more user signals and determining transmission channel estimates for each said user signal; (c) deriving a soft signal for a first user by subtracting, if available, weighted representations of other user signals from the detected user signal of said first user; (d) calculating a posteriori probabilities for each symbol comprising the soft signal; (e) refining said probabilities utilising the transmission channel estimate for the first user in an iterative decoding algorithm, wherein a probability is either partially or fully decoded depending on application of decoder convergence criteria; and returning to (a), (b) or (c) with the refined probabilities forming part of the weighted representations to be subtracted from detected user signals of other users.

2. The method of claim 1, further comprising the step of either continuing further steps or producing a hard signal for the first user and discontinuing further steps depending on the application of receiver convergence criteria to the decoded probabilities.

3. The method of claim 1, wherein during a first iteration of the iterative receiver process, the decoder convergence criteria includes comparing interference on the detected user signal for the first user with an interference threshold determined by estimating noise equivalence of interference on the detected user signal due to other user with the probabilities being fully decoded if the interference is below the interference threshold or partially decoded if the interference is above the interference threshold.

4. The method of claim 1, wherein the decoder convergence criteria includes adaptively adjusting a threshold of a stopping criteria, a probability being fully decoded when application of the stopping criteria to a probability results in a value less than the threshold and partially decoded when the application of the stopping criteria results in a value greater than the threshold.

5. The method of claim 4, wherein the stopping criteria utilise the refined probabilities from a previous iteration of the iterative decoding algorithm.

6. The method of claim 4, wherein the stopping criteria comprises a sign change ratio stopping criteria.

7. The method of claim 1, wherein the decoder convergence criteria utilises a stored value of an optimal number of iterations of the iterative decoding algorithm for any particular iteration of the iterative receiver process.

8. The method of claim 7, wherein the stored values are calculated from at least one of investigation of the convergence behaviour of the iterative decoding algorithm and the iterative receiver process.

9. The method of claim 8 wherein an investigation includes analysing an exchange of mutual information between the output of (c) and (e) during an offline simulation of the iterative receiver process.

10. The method of claim 1, wherein steps (c) (d) and (e) are carried out in parallel for each of the plurality of users detected in step (b).

11. The method of claim 10, wherein the refined probabilities for each user are combined with updated channel estimates to form the weighted representations of user signals used in a subsequent iteration of the iterative receiver process.

12. The method of claim 11, wherein the updated channel estimates for each user signal comprise an estimate of characteristics selected from a group of timing, interference, frequency, amplitude, phase and interference.

13. The method of claim 1, wherein the iterative decoding algorithm is a turbo decoding algorithm.

14. A receiver for processing a multi-user signal in an iterative receiver process, the receiver including: receiver means for receiving a signal transmission including a plurality of user signals on a TDMA channel;
a detector for detecting one or more user signals and determining transmission channel estimates for each said user signal; an interference canceller for deriving a soft signal for a first user by subtracting, if available, weighted representations of other user signals from the detected user signal of said first user; means for calculating a posteriori probabilities for each symbol comprising the soft signal; a digital signal processor for running an iterative decoding algorithm to refine the probabilities by utilising the transmission channel estimate for the first user, wherein a probability is either partially or fully decoded depending on application of decoder convergence criteria; and means for inputting the refined probabilities to the interference canceller to form part of the weighted representations to be subtracted from detected user signals of other users.

15. The receiver of claim 14, further comprising means for producing a hard signal for the first user and discontinuing the iterative receiver process depending on the application of receiver convergence criteria to the decoded probabilities.

16. The receiver of claim 14, wherein during the first iteration of the iterative receiver process, the decoder convergence criteria includes comparing interference on the detected user signal for the first user with an interference threshold determined by estimating noise equivalence of interference on the detected user signal due to other user signals, with the probabilities being fully decoded if the interference is below the interference threshold or partially decoded if the interference is above the interference threshold.

17. The receiver of claim 14, wherein the decoder convergence criteria includes adaptively adjusting a threshold of a stopping criteria, a probability being fully decoded when application of the stopping criteria to a probability results in a value less than the threshold and partially decoded when the application of the stopping criteria results in a value greater than the threshold.

18. The receiver of claim 17, wherein the stopping criteria utilise the refined probabilities from a previous iteration of the iterative decoding algorithm.

19. The receiver of claim 17, wherein the stopping criteria comprises a sign change ratio stopping criteria.

20. The receiver of claim 14, wherein the decoder convergence criteria utilises a stored value of optimal number of iterations of the iterative decoding algorithm for any particular iteration of the iterative receiver process.

21. The receiver of claim 20, wherein the stored values are calculated from investigation of the convergence behaviour of the iterative decoding algorithm and/or the iterative receiver process.

22. The receiver of claim 21 wherein an investigation includes analysing an exchange of mutual information between the output of the interference canceller and the iterative decoding during an offline simulation of the iterative receiver process.

23. The receiver of claim 14, including a plurality of calculating means and digital signal processors for the parallel refining and decoding of a posteriori probabilities for each of the plurality of users detected by the detector.

24. The receiver of claim 23, including a channel estimator for providing updated channel estimates for each user and combining the updated channel estimates with the refined probabilities to form the weighted representations of user signals used in a subsequent iteration of the iterative receiver process.

25. The receiver of claim 24, wherein the updated channel estimates for each user signal comprise an estimate of characteristics selected from a group of timing, interference, frequency, amplitude, phase and interference.

26. The receiver of claim 14, wherein the iterative decoding algorithm is a turbo decoding algorithm.

* * * * *